H. A. HOKE.
ROD PACKING.
APPLICATION FILED DEC. 21, 1916.
1,263,769.  Patented Apr. 23, 1918.
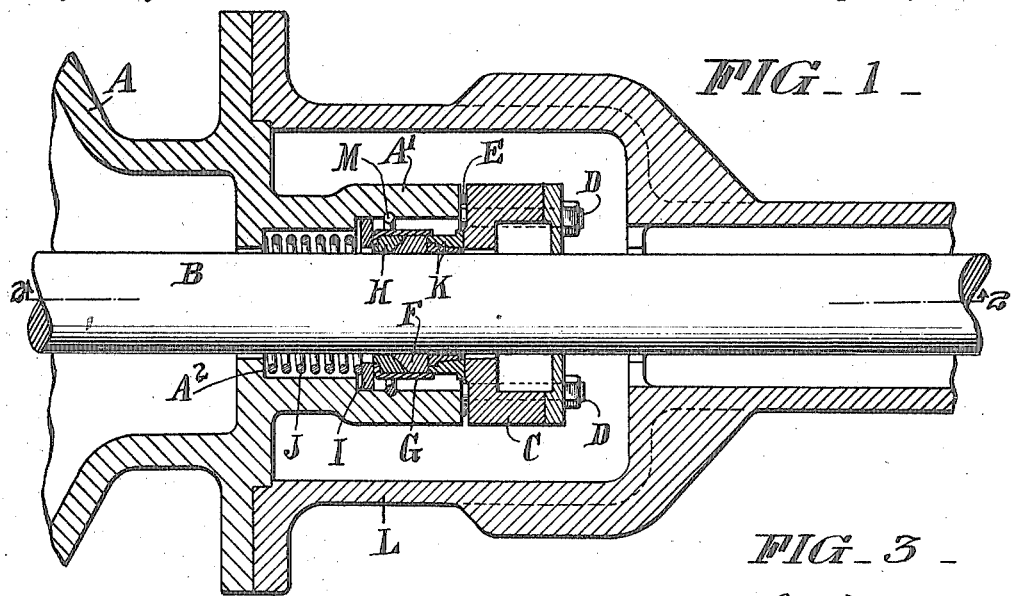
FIG_1_
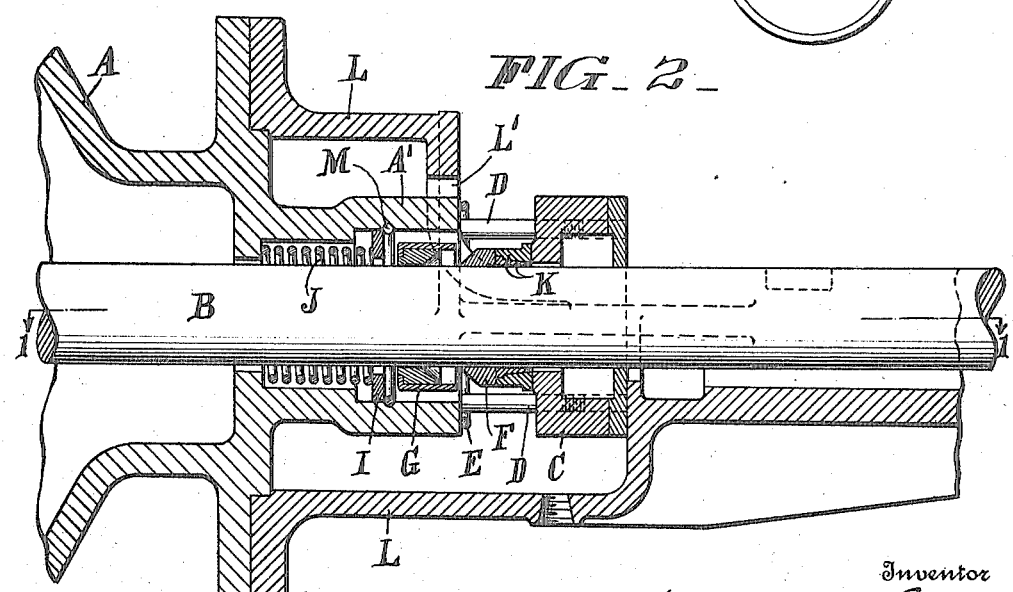
FIG_2_
FIG_3_

UNITED STATES PATENT OFFICE.

HARRY A. HOKE, OF ALTOONA, PENNSYLVANIA.

ROD-PACKING.

1,263,769.  Specification of Letters Patent.  Patented Apr. 23, 1918.

Application filed December 21, 1916. Serial No. 138,150.

*To all whom it may concern:*

Be it known that I, HARRY A. HOKE, a citizen of the United States of America, residing in Altoona, in the county of Blair, in the State of Pennsylvania, have invented certain new and useful Improvements in Rod-Packings, of which the following is a true and exact description, reference being had to the accompanying drawings, which form a part thereof.

My present invention relates to rod packings and particularly to rod packings of well known type, commonly employed on locomotive piston rods in which resilient means are employed to press the rod packing toward the outer end of the stuffing box against the removable member normally closing the outer end of the stuffing box. The object of my invention is to provide a rod packing of the type referred to with simple and effective provisions for restraining the action of said resilient means, and thereby facilitating the inspection or renewal of worn parts, when the packing is opened up for such purpose.

The various features of novelty which characterize my invention are pointed out with particularity in the claims annexed to and forming a part of this specification. For a better understanding of the invention, however, and the advantages possessed by it, reference should be had to the accompanying drawings and descriptive matter, in which I have illustrated and described a preferred embodiment of my invention.

Of the drawings:

Figure 1 is a section taken on the line 1—1 of Fig. 2 showing a portion of an engine provided with my improved packing;

Fig. 2 is a section taken on the line 2—2 of Fig. 1; and

Fig. 3 is an elevation of the spring-restraining device employed in Figs. 1 and 2.

In the drawings, A represents a locomotive cylinder head formed on its outer side with a tubular stuffing box portion or packing inclosure A' through which passes the piston rod B. The outer end of the stuffing box A' is normally closed by a plate or end member C which is secured in place by stud bolts D. E represents the usual sealing ring or washer interposed between the end member C and the end of the stuffing box portion A' of the cylinder head. Within the stuffing box is located a rod packing which, as shown, is of well known type and comprises a sectional packing ring F formed of soft metal. The ring F is surrounded by a casing or retainer G which also incloses a washer member H having a conical outer end surface which receives the conical inner end of the packing ring F, and thereby tends to compress the latter about the rod B. The retainer G, and thereby the washer H and packing ring F are pressed axially outward by a coil spring J which surrounds the rod B and bears at its inner end against the bottom wall $A^2$ of the stuffing box and bears at its outer end against a follower or washer I interposed between the spring and the retainer G. The outer end of the packing ring F bears against the end of the usual composite ring or floating washer K. The outer end of the washer K bears against, and makes a tight joint with the inner face of the end member C. In so far as above described, the rod packing shown is of a type in common use.

With the type of rod packing shown, as heretofore constructed, difficulty has been experienced when the stuffing box is opened up for inspection or renewal of the packing ring F. This difficulty has arisen from the fact that the spring J must be of considerable length when expanded, and under considerable tension in normal operation, so that when the end member C is removed, the spring J tends to elongate and thereby give considerable axial movement to the washer I. This has necessitated a considerable axial displacement of the rod packing and cover plate C to obviate interference from the spring J with the operation of inspecting or renewing the packing ring F. This difficulty has been particularly serious where conditions are such as to restrict the outward movement of the member C which may readily be given to the latter when it is desired to open up the packing. For example, where, as in the construction illustrated, the packing is applied at the front end of the cylinder to the so-called extended piston rod, and the front cylinder head has secured to it a carrier casting L as shown in the drawings, the latter ordinarily prevents an outward movement of the cover C sufficient to permit the inspection or renewal of the packing ring F without interference with such inspection and renewal by the spring J. The difficulty in this case is increased by the fact that the opening L' in the carrier casting through which the rod packing must be inspected and the ring F renewed is ordinarily quite small.

With the present invention, the difficulties to which reference has been made are avoided by placing in the stuffing box a spring restraining element M which is located so as not to interfere with the normal operation of the spring J when the stuffing box is in its normal closed position but which prevents more than a slight outward movement of the spring pressed follower I when the cap C is removed. The spring restraining device M in the preferred form shown is a split resilient ring of slightly greater unflexed diameter than the diameter of the circumferential groove formed in the inner wall of the stuffing box A' to receive the ring M and into which the latter is sprung when the cap C is removed and the packing is moved out of the stuffing box, the ring M may be engaged by a suitable implement and removed, when this is necessary or desirable, as to permit a new spring J or follower I to be put in place.

Having now described my invention, what I claim as new and desire to secure by Letters Patent, is:—

1. In a rod packing, the combination with a packing inclosure through which the rod to be packed may extend comprising a chambered body member formed with an internal recess, and a removable end member at the outer end of said body member, of an annular packing located in said inclosure with its outer end in engagement with said end member, an annular spring element located in said inclosure and acting between the latter and the packing to press the latter outward against said end member, a washer or spring follower interposed between said spring element and said packing and projecting beyond the periphery of the latter, and resilient means detachably received in said recess in position to engage said washer and restrict its outward movement.

2. In a rod packing, the combination with a packing inclosure through which the rod to be packed may extend and a removable end member at the outer end of said inclosure, of an annular packing located in said inclosure with its outer end in engagement with said member, an annular spring element located in said inclosure and acting between the latter and said packing to press the latter outward against the said end member, a washer or follower element interposed between the outer end of said spring element and said packing and projecting beyond the periphery of the latter, said inclosure being formed internally with a circumferential groove and a split ring insertible and removable through the outer end of said inclosure when said end member is removed sprung into place in said groove and adapted to engage the said washer and restrict the outward movement of the latter.

HARRY A. HOKE.

Copies of this patent may be obtained for five cents each, by addressing the "Commissioner of Patents, Washington, D. C."